(12) United States Patent
Yasuda (10) Patent No.: US 11,365,100 B2
(45) Date of Patent: Jun. 21, 2022

(54) WINCH CONTROL SYSTEM

(71) Applicant: GLOBERIDE, Inc., Tokyo (JP)

(72) Inventor: Hiromu Yasuda, Higashi Kurume (JP)

(73) Assignee: GLOBERIDE, INC., Tokyo (JP)

( * ) Notice: Subject to any disclaimer, the term of this patent is extended or adjusted under 35 U.S.C. 154(b) by 153 days.

(21) Appl. No.: 16/822,516

(22) Filed: Mar. 18, 2020

(65) Prior Publication Data

US 2020/0307970 A1 Oct. 1, 2020

(30) Foreign Application Priority Data

Mar. 29, 2019 (JP) ............................. JP2019-068179

(51) Int. Cl.
| | | |
|---|---|---|
| *B66D 1/48* | (2006.01) | |
| *H04N 5/232* | (2006.01) | |
| *B66D 1/26* | (2006.01) | |

(52) U.S. Cl.
CPC ......... *B66D 1/485* (2013.01); *H04N 5/23203* (2013.01); *H04N 5/23296* (2013.01); *H04N 5/23299* (2018.08); *B66D 1/26* (2013.01)

(58) Field of Classification Search
CPC ........... H04N 5/23299; H04N 5/23203; H04N 5/23296; B66D 1/485; B66D 1/26; B66C 13/18; B66C 13/46
See application file for complete search history.

(56) References Cited

U.S. PATENT DOCUMENTS

| | | | |
|---|---|---|---|
| 4,180,171 A | 12/1979 | Cunningham et al. | |
| 2006/0163546 A1* | 7/2006 | Marcil | B66D 1/56 254/271 |
| 2009/0207250 A1* | 8/2009 | Bennett | F16M 11/2064 348/144 |

(Continued)

FOREIGN PATENT DOCUMENTS

| | | |
|---|---|---|
| CN | 101837931 A | 9/2010 |
| CN | 202594687 U | 12/2012 |

(Continued)

OTHER PUBLICATIONS

First Office Action dated May 8, 2021, of counterpart Chinese Application No. 202010227834.1, along with an English translation.
The Extended European Search Report dated Aug. 11, 2020, of counterpart European Application No. 20162975.5.

(Continued)

*Primary Examiner* — Michael E Gallion
(74) *Attorney, Agent, or Firm* — K&L Gates LLP (57) ABSTRACT

A winch control system includes: a distance measurement unit that measures a winch-to-winch distance between first and second winches based on the wound length of a second wire or the unwound length of a first wire when an object suspended through the first wire from the first winch and suspended through the second wire from the second winch is moved from the first winch to the second winch; and a relative position determination unit that determines the (Continued)

relative position of the second winch with respect to the first winch based on the winch-to-winch distance. The length of the first wire unwound from the first winch and the length of the second wire unwound from the second winch are calculated based on the relative position of the second winch with respect to the first winch and the target position of the object.

4 Claims, 4 Drawing Sheets

(56) References Cited

U.S. PATENT DOCUMENTS

| | | | | |
|---|---|---|---|---|
| 2013/0245815 | A1* | 9/2013 | Schneider | B66C 13/04 |
| | | | | 700/228 |
| 2014/0145129 | A1* | 5/2014 | Bauder | B66D 1/46 |
| | | | | 254/275 |
| 2015/0284225 | A1 | 10/2015 | Hall et al. | |
| 2016/0119589 | A1* | 4/2016 | Tanizumi | B66C 13/16 |
| | | | | 348/144 |
| 2019/0031474 | A1* | 1/2019 | Stilborn | B66C 13/16 |
| 2019/0098221 | A1* | 3/2019 | Troy | G01C 11/02 |

FOREIGN PATENT DOCUMENTS

| | | | |
|---|---|---|---|
| CN | 103145041 | | 6/2013 |
| CN | 103253594 | | 8/2013 |
| CN | 205966843 U | | 2/2017 |
| CN | 111170176 A | * | 5/2020 |
| EP | 2466252 A1 | | 6/2012 |
| EP | 2636634 A1 | * | 9/2013 ............. B66C 23/26 |
| EP | 3460393 A1 | | 3/2019 |
| JP | 01-255383 | | 10/1989 |
| JP | 08-104497 | | 4/1996 |
| JP | 08-119583 | | 5/1996 |
| JP | 08-299600 | | 11/1996 |
| JP | 2000-032325 | | 1/2000 |
| JP | 2000-143175 | | 5/2000 |
| JP | 2000-313590 | | 11/2000 |
| JP | 3297008 | | 7/2002 |
| KR | 2004-0025498 A | | 3/2004 |
| KR | 2012-0011592 A | | 2/2012 |
| KR | 2013-0109671 A | | 10/2013 |

OTHER PUBLICATIONS

Japanese Office Action for related Japanese Application No. 2019-068179; action dated Mar. 22, 2022; (6 pages).

* cited by examiner

WINCH CONTROL SYSTEM

TECHNICAL FIELD

This disclosure relates to a winch control system that controls the operation of a winch that winds and unwinds a wire.

BACKGROUND

A photography device for photographing a subject using a camera suspended by a wire from a plurality of winches installed at a high position is generally known. Such a photography device is installed in, for example, athletic facilities, art galleries, concert halls and the like. The movement of the camera for photographing is controlled by operating a winch by a winch control system. It is possible to move the camera to a position designated by the operator by, for example, controlling winches so that some winches may wind, and others may unwind, a wire. A conventional photography device provided with such a winch control system is described in, for example, Japanese Patent Application Publication No. H1-255383 and Japanese Patent Application Publication No. 2000-32325.

In a conventional winch control system, to set a movable range of an object suspended from a wire or determine an unwound amount and a wound length of a wire attached to each of a plurality of winches to move the object to a target position, information indicating the relative positions of the plurality of winches is required. For example, when a plurality of winches are installed on a column or a beam of a facility, it is necessary to obtain the relative positions of the winches from the design data of the structure, or to measure the position of each of the winches. However, the facility users normally do not have access to the design data. Further, to measure the positions of the winches, a positioning device unrelated to the original function of the winches such as an optical wave measurement device or a GPS positioning device, is required.

As described above, in the winch control system that moves an object suspended by a wire by controlling a winch, it is required to make information indicating the position of each winch available without using the design data of the facility in which winches are installed. In the winch control system, it is also desirable to minimize the use of positioning devices unrelated to the movement of winches to obtain position information for each winch.

It could therefore be helpful to provide a winch control system capable of easily determining the relative positions of a plurality of winches for moving objects suspended by wires.

SUMMARY

I thus provide:

A winch control system may include: a first winch that winds a first wire for suspending an object; a second winch arranged apart from the first winch and that winds a second wire for suspending the object; a distance measurement unit that measures the winch-to-winch distance between the first winch and the second winch based on the wound length of the second wire or the unwound length of the first wire when moving the object from the first winch to the second winch; a relative position determination unit that determines the relative position of the second winch with respect to the first winch based on the winch-to-which distance; an unwound length calculation unit that calculates the unwound length of the first wire indicating the length of the first wire unwound from the first winch and the unwound length of the second wire indicating the length of the second wire unwound from the second winch, based on the relative position of the second winch with respect to the first winch and a target position to which the object is to be moved; and a winch control unit that controls the first winch based on the unwound length of the first wire and controls the second winch based on the unwound length of the second wire.

A winch control system may include a first height indicator that measures a first height, which is the height of the first winch, and a second height indicator that measures a second height, which is the height of the second winch. The relative position of the second winch with respect to the first winch is measured based on the winch-to-winch distance, the first height and the second height.

A winch control system may include a third winch arranged apart from each of the first and the second winches, which winds a third wire for suspending the object. The relative position determination unit may determine the relative position of the third winch with respect to the first winch, the unwound length calculation unit calculates the unwound length of the third wire indicating the unwound lengths of the first and the second wires and the length of the third wire unwound from the third winch based on the relative position of the second winch, the relative position of the third winch and the target position to which the object is to move, and the winch control unit controls the third winch based on the unwound length of the third wire.

My systems allow for easy determination of the relative positions of a plurality of winches that moves an object suspended by a wire.

BRIEF DESCRIPTION OF THE DRAWINGS

FIG. 3B shows a schematic diagram that explains a method of measuring a winch-to-winch distance. In FIG. 3B, a wire 20A is wound around a winch 10A until an object M comes into contact with the winch 10A.

FIG. 3C shows a schematic diagram that explains a method of measuring a winch-to-winch distance. In FIG. 3C, a wire 20B is wound by a winch 10B whereby the object M is moved from a winch 10A toward a winch 10B.

FIG. 3D shows a schematic diagram that explains a method of measuring a winch-to-winch distance. In FIG. 3D, the wire 20B is wound on the winch 10B until the object M comes into contact with the winch 10B.

DESCRIPTION OF THE NUMERICAL REFERENCES

1 Winch control system
10A, 10B, 10C Winches
11A, 11B Motors
12A, 12B Spools
13A, 13B Height indicators
14A, 14B Encoders
20A, 20B, 20C Wires
30 Operation panel 50 Controller
51 Processor
51a Distance measurement unit
51b Relative position determination unit
51c Unwound length calculation unit
51d Winch control unit
C Ceiling
M Object

DETAILED DESCRIPTION

Hereinafter, various examples will be described with reference to the drawings as appropriate. The same reference numbers are assigned to components common to the respective drawings, and that the drawings are not necessarily to scale for convenience of explanation.

Figure 1:
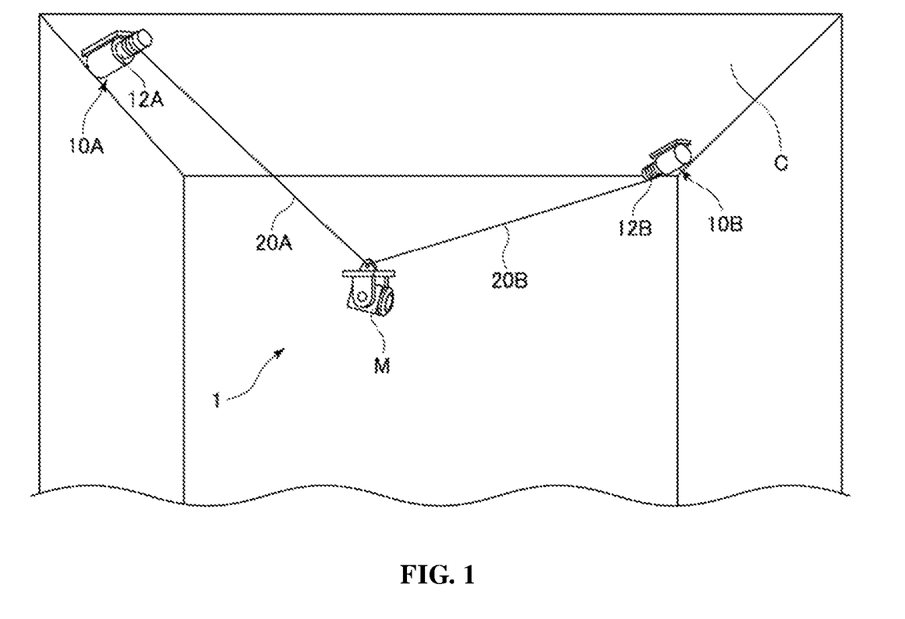
FIG. 1 shows a perspective view schematically indicating a winch control system according to an example.
Figure 2:
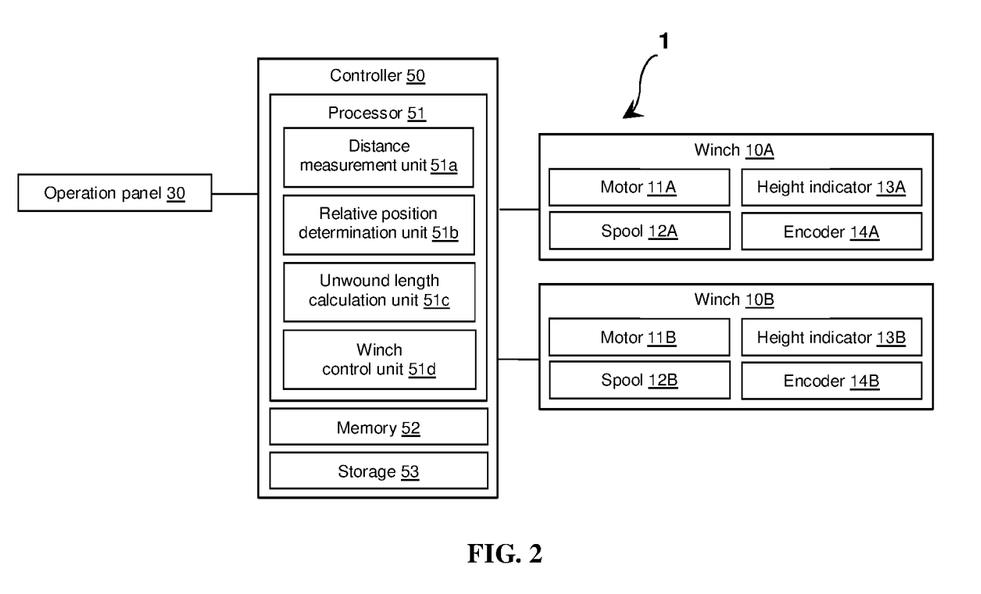
FIG. 2 shows a block diagram that explains the function of the winch control system in FIG. 1.

A winch control system 1 according to an example will be described with reference to FIGS. 1 and 2. FIG. 1 shows a perspective view that schematically indicates the winch control system 1 according to an example, and FIG. 2 shows a block diagram that explains the functions of the winch control system 1.

As illustrated, the winch control system 1 includes the winch 10A, the wire 20A wound around the winch 10A, the winch 10B, and the wire 20B wound around the winch 10B. The winch control system 1 may have three or more winches.

In the winch control system 1, the object M is suspended by the wires 20A and 20B. The object M suspended from the winch control system 1 is any object that may be suspended by the winch control system 1. The object M includes, for example, a camera, lighting device, speaker, microphone, sensor, fire extinguishing appliance, cargo and other objects. The winch control system 1 can move the object M to a target position designated by the operator by winding and unwinding the wire 20A by the winch 10A and the wire 20B by the winch 10B.

One end of the wire 20A is attached to the winch 10A, and the other end thereof is attached to the object M. Similarly, one end of the wire 20B is attached to the winch 10B and the other end thereof is attached to the object M. Thus, the object M is suspended by the wires 20A and 20B. The wires 20A and 20B may be attached directly to the object M, or may be attached via an object support other than the object M.

The wires 20A and 20B may be single wires or twisted wires made of a metal material, a synthetic resin material or other materials. A suitable wire 20 is selected depending on the weight of the object M to be suspended, the environment of use or other factors. It is desirable that the wires 20A and 20B are flexible enough to be wound around the winches 10A and 10B.

In the illustrated example, the winches 10A and 10B are attached apart from each other at locations on the ceiling C of a building. The building may be, for example, a live studio, museum, gymnasium or any other building. The winches 10A and 10B may be attached to a pillar, beam and other structures of the building other than the ceiling. The winches 10A and 10B may also be attached to various structures other than a building such as a sports stadium and bridge. The winches 10A and 10B may be arranged at the same height or at different heights from each other.

The winch 10A has a pair of plate-shaped flanges and a spool 12A provided between the pair of flanges. The wire 20A is wound around the outer peripheral surface of the spool 12A of the winch 10A. The spool 12A is supported by the pair of flanges to be rotatable about a rotation axis. When the winch 10A is driven, the spool 12A rotates forward or backward about the rotation axis. When the spool 12A rotates in the forward direction, a wire is wound on the spool 12A. Conversely, when the spool 12A rotates in the backward direction, a wire is unwound from the spool 12A. Unwinding from, and winding on, the winch 10A may be performed according to a prescribed algorithm or as instructed by a remote operator. The winch 10B has a pair of plate-shaped flanges and a spool 12B provided between the pair of flanges. The description of the configuration and operation of the winch 10A also in essence applies to the winch 10B.

Next, the function of the winch control system 1 will be described in more detail with reference to FIG. 2. As illustrated, the winch control system 1 includes the winch 10A, the winch 10B, an operation panel 30 and a controller 50. In addition to the spool 12A, the winch 10A may include a motor 11A, a height indicator 13A and an encoder 14A, which are not shown in FIG. 1. In addition to the spool 12B, the winch 10B may include a motor 11B, a height indicator 13B and an encoder 14B, which are not shown in FIG. 1. The motor 11A outputs a rotational driving force to the spool 12A, and the motor 11B outputs a rotational driving force to the spool 12B. The height indicator 13A detects the height of the winch 10A, and the height indicator 13B detects the height of the winch 10B. The height indicators 13A and 13B are, for example, radio height indicators and barometric height indicators. When the winches 10A and 10B are installed at the same height, the height indicator is not required. The encoder 14A detects the length of the wire 20A unwound from the spool 12A, and the encoder 14B detects the length of the wire 20B unwound from the spool 12B. The encoders 14A and 14B are, for example, rotary encoders.

The operation panel 30 includes various operating elements to drive the winches 10A and 10B. The operating element may take any form such as a stick, button, knob and touch panel. The operation panel 30 includes, for example, a winch driving stick that tilts according to the operation of an operator. When the winch driving stick is tilted by the operation of the operator, the operation panel 30 transmits an operation signal indicating the direction and angle of the tilt to the controller 50. The operation panel 30 may directly transmit a signal instructing the operation of the object M to the controller 50 or the object M. For example, when a camera for which the object M is attached to the wires 20A and 20B via a camera platform, the operation panel 30 may include a camera platform operation stick for operating the camera platform. When the operator tilts the camera platform operation stick, the operation panel 30 may directly transmit a signal instructing the operation of the platform to the controller 50 or the object M. Thus, the pan operation and the tilt operation of the camera attached to the wires 20A and 20B can be performed by operating the camera platform operation stick. In addition to the above, the operation panel 30 may include an operating element for remotely operating the object M attached to the wires 20A and 20B. For example, when the object M is a camera, the operation panel 30 may include a zoom knob for changing the angle of view of the camera, and a recording button for controlling the start/end of shooting.

The operation panel 30 may be configured to accept an input of the target position from the operator to move the object M to a desired target position. The operation panel 30 may include a touch panel, and may accept an input of a target position by a touch input to the touch panel. For example, the operator can display an image indicating the arrangement of the winches 10A and 10B, and the object M on the touch panel and can, by touching the position to which the object is to be moved in the image, set the position as the target position. The operation panel 30 may accept the coordinate value of the target position from the operator.

The controller 50 includes a computer processor 51, a memory 52 and a storage 53. The controller 50 may be accommodated in a housing disposed apart from the winches 10A and 10B in a building, or may be incorporated in at least one of the winches 10A and 10B. The computer processor 51 is an arithmetic unit that loads various programs from the storage 53 or other storage into the memory 52, and executes instructions included in the loaded programs. The computer processor 51 is, for example, a CPU, MPU, DSP, GPU or other various arithmetic units. The computer processor 51 may be implemented by integrated circuits such as ASIC, PLD, FPGA and MCU. Though the computer processor 51 is illustrated as a single component in FIG. 2, the computer processor 51 may be a collection of a plurality of physically separate computer processors. The program described herein as being executed by the computer processor 51 or the instructions contained in the program may be executed by a single computer processor or by a plurality of computer processors in a distributed manner.

Next, the functions realized by the computer processor 51 will be described in more detail. The computer processor 51 functions as: a distance measurement unit 51*a* that measures a winch-to-winch distance between the winches 10A and 10B; a relative position determination unit 51*b* that determines the relative position of the winch 10B with respect to the winch 10A based on the winch-to-winch distance measured by the distance measurement unit 51*a*; an unwound length calculation unit 51*c* that determines the unwound lengths of the wires 20A and 20B to move the object M to a specified target position; and a winch control unit 51*d* that drives the winches 10A and 10B. The winch control unit 51*d* may drive the winches 10A and 10B by outputting a PWM signal to the motors 11A and 11B to control the rotation speeds of the motors 11A and 11B.

Figure 3A:
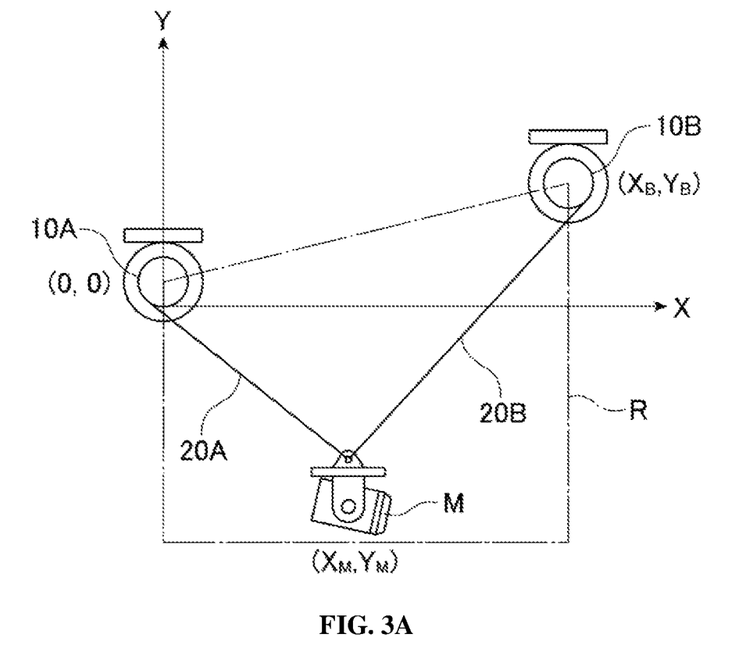
FIG. 3A shows a schematic diagram that explains a method of measuring a winch-to-winch distance.

Examples of methods of measuring winch-to-winch distances will be described with reference to FIGS. 3A to 3D. A winch-to-winch distance is measured based on the length of the wire 20B wound by the winch 10B. FIGS. 3A to 3D are schematic diagrams that explain how to measure winch-to-winch distances. In these drawings, the positions of the winches 10A and 10B and the object M are described with the horizontal direction passing through the winches 10A and 10B projected on the horizontal plane as the x-axis direction and the vertical direction as the y-axis direction. The winch 10A is arranged at the origin of the x-y coordinate space. The object M may also move in directions perpendicular to the x- and y-axes, but the object M will lie on the x-y plane over time because of the tension from the wires 20A and 20B exerting a force towards the x-y plane. Therefore, as shown in FIG. 3A, the range in which the object M can move is an area surrounded by the vertical line extending vertically downward from each of the winches 10A and 10B along the y-axis direction, the straight line connecting the winches 10A and 10B, and the ground surface (or the floor surface of a building) on the x-y plane.

Figure 3B:
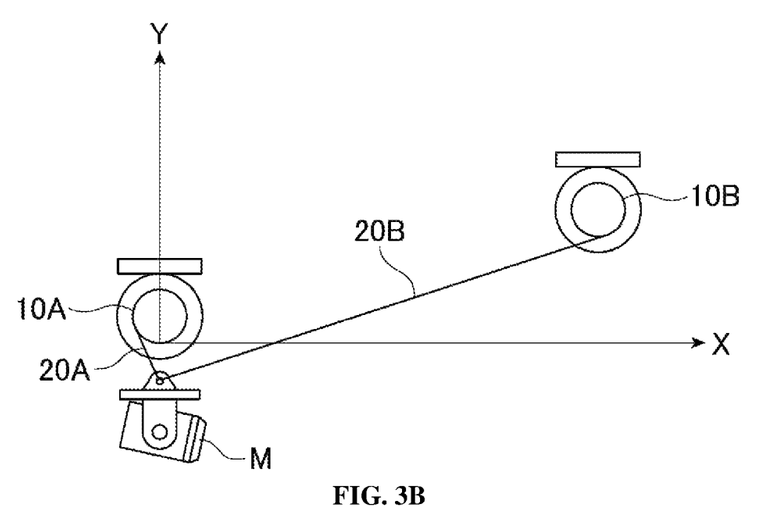

To measure the winch-to-winch distances, the object M is first attached to the wires 20A and 20B, as shown in FIG. 3A. Next, the winch 10A winds the wire 20A, and the winch 10B unwinds the wire 20B by an unwound length corresponding to the length of wire wound by the winch 10A. As shown in FIG. 3B, the winch 10A winds the wire 20 until the object M reaches a first proximity position proximate to the winch 10A. The first proximity position may be a position where the object M comes into contact with the winch 10A, or may be a position where the object M comes extremely close to the winch 10A (for example, a position where the distance between the two is 10 cm or less). It can be detected by, for example, the contact sensor provided on the winch 10A that the object M comes into contact with the winch 10A. It can be detected by a non-contact proximity sensor that the object M comes extremely close to the winch 10A. In this manner, the winches 10A and 10B are driven so that the object M moves to the first proximity position proximate to the winch 10A.

Figure 3C:
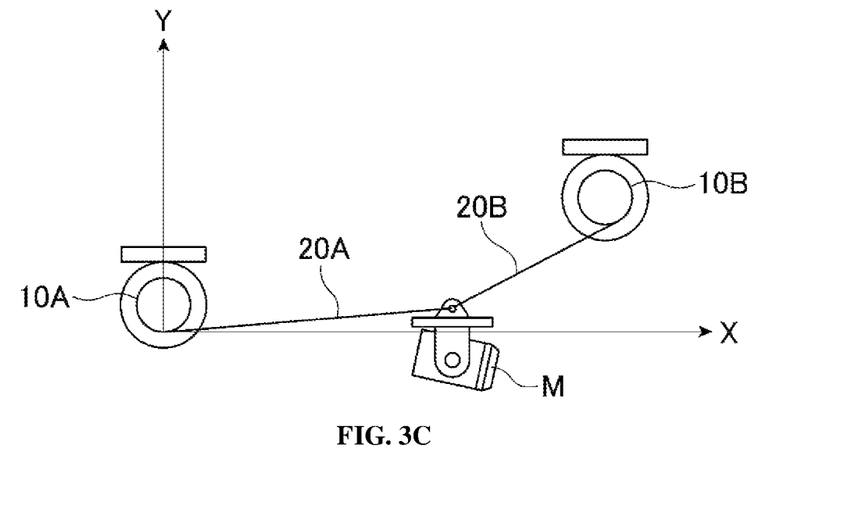

When it is detected that the object M has moved to the first proximity position, the winch 10B winds up the wire 20B. At this time, the winch 10A unwinds the wire 20A by an unwound length corresponding to the length of wire wound by the winch 10B. As a result, as shown in FIG. 3C, the object M moves from the winch 10A toward the winch 10B. Since the winch 10A unwinds the wire 20A by the unwound length corresponding to the length of wire wound by the wire 20B, the object M moves from the winch 10A to the winch 10B along the trajectory on the straight line connecting the winches 10A and 10B. The trajectory of the object M between the winches 10A and 10B may be a trajectory slightly deviated vertically downward from the straight line connecting the winches 10A and 10B due to gravity acting on the object M.

Figure 3D:
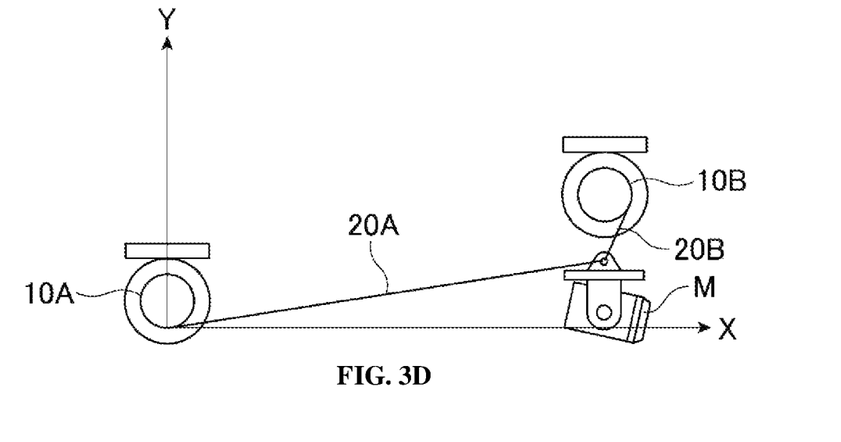

As shown in FIG. 3D, the winch 10B winds the wire 20B until the object M reaches the second proximity position proximate to the winch 10B. The second proximity position may be a position at which the object M comes into contact with the winch 10B, or a position at which the object M comes extremely close to the winch 10B (for example, a position at which the distance between the two is 10 cm or less). It can be detected by a contact sensor or a non-contact sensor that the object M is in the second proximity position.

Winding the wire 20A by the winch 10A and unwinding the wire 20B by the winch 10B to move the object M from the position shown in FIG. 3A to the position shown in FIG. 3D are performed, for example, by the winch control unit 51*d* controlling the rotations of the motors 11A and 11B.

The distance measurement unit 51*a* can set the length of the wire 20B wound by the winch 10B to wind the object M from the first proximity position to the second proximity position as the winch-to-winch distance between the winches 10A and 10B. Since the length of the wire 20B wound by the winch 10B is equal to the length of the wire 20A unwound by the winch 10A, the distance measurement unit 51*a* may set the length of the wire 20A unwound by the winch 10A to wind the object M from the first proximity position to the second proximity position as the winch-to-winch distance between the winches 10A and 10B. The unwound length of the wire 20A can be detected by the encoder 14A, and the wound length of the wire 20B can be detected by the encoder 14B.

The relative position determination unit 51*b* determines the relative position of the winch 10B with respect to the winch 10A based on the winch-to-winch distance between the winches 10A and 10B measured by the distance measurement unit 51*a*. Since the winch 10A is disposed at the origin of the x-y coordinate space, the relative position of the winch 10B can be shown by coordinates in the x-y coordinate space. As in the illustrated example, when the winches 10A and 10B are installed on the ceiling of a building, the positions of the winches 10A and 10B in the vertical direction (i.e., the height) become equal so that the value YB of the y-coordinate of the winch 10B is 0. When the winch-to-winch distance between the winches 10A and 10B measured by the distance measurement unit 51*a* is LAB, the value XB of the x-coordinate of the winch 10B is LAB. Therefore, the position (XB, YB) of the winch 10B is (LAB, 0). At this time, the movable area R is the internal area of the rectangle surrounded by vertical lines extending vertically downward from the respective winches, and by the line segments connecting the winches 10A and 10B to the ground surface.

Depending on the installation positions of the winches 10A and 10B, the positions of the winches 10A and 10B in the y-coordinate may differ. In this example, to find out the position of the winch 10B in the x-y coordinate space, it is necessary to obtain the heights of the winches 10A and 10B. In this example, the relative position determination unit 51b can calculate the difference in height between the winch 10A detected by the height indicator 13A and the winch 10B detected by the height indicator 13B, and can set the difference in height as the value of the y-coordinate of the winch 10B. The angle of the wire 20B stretched between the winches 10A and 10B without slack with respect to the vertical direction can be detected, and the y-coordinate of the winch 10B can then be calculated based on the angle. More specifically, when the angle formed between the wire 20B and the vertical direction is θ, it holds that YB=LAB·cos θ. The angle of the wire 20B with respect to the vertical direction may be detected by a tilt sensor, acceleration sensor or other sensors. In this manner, the direction of the winch 10B relative to the winch 10A can be detected, based on which the value of the y-coordinate of the wire 20B (i.e., the relative height with respect to the winch 10A) can be obtained.

As described above, when the winches 10A and 10B are arranged at the same height, the relative position determination unit 51b determines the coordinates of the winch 10B in the x-y coordinate space based on the winch-to-winch distance between the winches 10A and 10B measured by the distance measurement unit 51a. When the winches 10A and 10B are arranged at different heights, the relative position determination unit 51b determines the coordinates of the winch 10B in the x-y coordinate space based on the winch-to-winch distance and the difference in height between the winches 10A and 10B.

To move the object M to the target position designated by the operation panel 30, the unwound length calculation unit 51c calculates the length of the wire 20A unwound from the winch 10A and the length of the wire 20B unwound from the winch 10B. The length of the wire 20A unwound from the winch 10A indicates the length of the wire 20A unwound from the winch 10A. When the unwound length of the wire 20A is zero, the object M is in contact with the winch 10A because the wire 20A is wound around the winch 10A to the maximum extent. Thus, the unwound length of the wire 20A represents the distance along the wire 20A between the winch 10A and the object M. Similarly, the length of the wire 20B unwound from the winch 10B represents the distance along the wire 20B between the winch 10B and the object M. The unwound length calculation unit 51c calculates an unwound length LAM of the wire 20A unwound from the winch 10A and the unwound length LBM of the wire 20B unwound from the winch 10B, based on the relative position of the winch 10B with respect to the winch 10A (i.e., the coordinates of the winch 10B in the x-y space) and the coordinates of the target position to which the object M is to move. Assuming that the target position of the object M is set to (XM, YM) based on the operation of the operation panel 30, and that the coordinates of the winch 10B determined by the relative position determination unit 51b are (XB, YB), the relationship among LAM, LBM, XM, YM, XB and YB can be written as follows.

Equation (1)

$$X_M^2 + Y_M^2 = L_{AM}^2 \qquad (1)$$

Equation (2)

$$(X_B - X_M)^2 + (Y_B - Y_M)^2 = L_{BM}^2 \qquad (2)$$

The unwound length LAM and the unwound length LBM are obtained from the equations (1) and (2) as follows.

Equation (3)

$$L_{AM} = \sqrt{X_M^2 + Y_M^2} \qquad (3)$$

Equation (4)

$$L_{BM} = \sqrt{(X_B - X_M)^2 + (Y_B - Y_M)^2} \qquad (4)$$

In this manner, the unwound length LAM of the wire 20A and the unwound length LBM of the wire 20B can be calculated by equations (3) and (4), respectively.

The winch control unit 51d drives the winch 10A so that the unwound length of the wire 20A becomes equal to the unwound length LAM calculated by the unwound length calculation unit 51c, and drives the winch 10B so that the unwound length of the wire 20B becomes equal to the unwound length LAB calculated by the unwound length calculation unit 51c, which makes it possible to move the object M to the target position (XM, YM).

When the object M moves out of the movable area R shown in FIG. 3A, slack occurs in either of the wires 20A and 20B so that the attitude and position of the object M cannot be stably controlled. Therefore, when an instruction is given to move the object M out of the movable area R (for example, when a target position outside the movable area R is set by the operation panel 30), the controller 50 may be configured not to drive the winch based on the instruction. In another example, when an instruction is given to move the object M out of the movable area R, a warning is displayed or a beep is given by the operation panel 30 or another alarm, which makes it possible to warn that an inappropriate position has been designated as the target position of the object M. In another example, when an instruction is given to move the object M out of the movable area R, the object M may be moved to the boundary of the movable area R and stopped at the boundary instead of being moved to the target position. Through these controls, even when an instruction is given to move the object M out of the movable area R, the attitude and position of the object M can be stabilized.

Next, the winch control system 1 according to another example will be described with reference to FIG. 4. The winch control system 1 shown in FIG. 4 differs from the example in FIG. 1 with two winches in that it has three winches. The winch control system 1 shown in FIG. 4 includes the winches 10A, 10B and 10C. The winch 10C can wind and unwind a wire 20C under the control of the winch control unit 51d. One end of the wire 20C is attached to the object M. The winch 10C is attached at a position apart from the winches 10A and 10B. The description of the configuration and operation of the winch 10A also in essence applies to the winch 10C.

Figure 4:
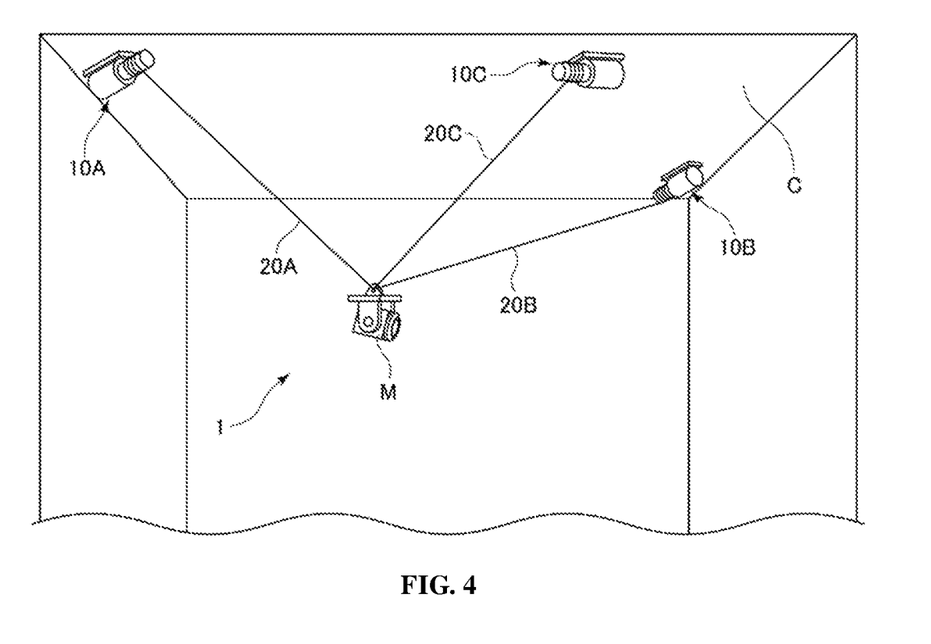
FIG. 4 shows a perspective view schematically indicating the winch control system according to another example.

In the winch control system 1 shown in FIG. 4, the relative position determination unit 51b determines the relative positions of the winches 10B and 10C with respect to the winch 10A (i.e., the x-y coordinates). The relative position of the winch 10B is determined by the method described. The relative position of the winch 10C with respect to the winch 10A is determined based on the length of the wire 20C wound by the winch 10C (or the length of the wire 20A unwound by the winch 10A) when the object M is moved from the winch 10A to the winch 10C, similarly to the method of determining the relative position of the winch 10B. The winch 10C may include a height indicator that detects the height of the winch 10C. When the height of the installation position of the winch 10C differs from the height of the installation position of the winch 10A, the relative position determination unit 51b can set the difference between the heights of the winches 10C and 10A as the value of the y-coordinate of the winch 10C.

The position of the winch 10C may be measured using a positioning device such as a GPS positioning device. The relative position determination unit 51b can determine the relative position of the winch 10C with respect to the winch 10A based on the position of the winch 10C measured by the positioning device. If necessary, the position of the winch 10A may also be measured by a positioning device such as GPS, and the relative position determination unit 51b can determine the relative position of the winch 10C with respect to the winch 10A also in consideration of the position of the winch 10A calculated by the positioning device.

In the winch control system 1 shown in FIG. 4, to move the object M to the target position designated by the operation panel 30, the unwound length calculation unit 51c calculates the length of the wire 20A unwound from the winch 10A, the length of the wire 20B unwound from the winch 10B, and the length of the wire 20C unwound from the winch 10C. The length of the wire 20C unwound from the winch 10C is calculated by the same method of calculating the length of the wire 20B unwound from the winch 10B as referred to above. The winch control unit 51d drives the winches 10A, 10B and 10C so that the unwound length of each of the wires 20A, 20B and 20C becomes equal to the unwound length calculated by the unwound length calculation unit 51c, which makes it possible to move the object M to the target position.

Next, the effect of the above example will be described. In one example described above, the winches 10A and 10B may be driven so that the object M is moved to a target position based on the relative position of the winch 10B with respect to the winch 10A located at the origin that is determined based on the length of the wire 20B wound by the winch 10B (or the length of the wire 20A unwound by the winch 10A) when the object M is moved from the winch 10A to the winch 10B. Therefore, the relative position of the winch 10B with respect to the winch 10A can be determined without accessing the design data of the installation location of the winches 10A and 10B and without using a positioning device for positioning the winches 10A and 10B, and based on so determined relative position, the object M can be moved to the target position.

The dimension, material and arrangement of each component described herein are not limited to those explicitly explained in the examples, and each component can be transformed so as to have any dimension, material and arrangement that may be included within the scope of this disclosure. Further, components not explicitly described in this specification may be added to the described examples, or some of the components explained in each example may be omitted.

The above examples may be combined as appropriate. An example realized by combining a plurality of examples may also be an example.

What is claimed is:

1. A winch control system comprising:
a first winch that winds a first wire that suspends an object;
a second winch arranged apart from the first winch that winds a second wire that suspends the object;
a distance measurement unit that measures a winch-to-winch distance between the first and second winches based on a wound length of the second wire or an unwound length of the first wire when the object is moved from the first winch to the second winch;
a relative position determination unit that determines a relative position of the second winch with respect to the first winch based on the winch-to-winch distance;
an unwound length calculation unit that calculates, based on the relative position of the second winch with respect to the first winch and a target position to which the object is to be moved, the unwound length of the first wire indicating a length of the first wire unwound from the first winch and the unwound length of the second wire indicating a length of the second wire unwound from the second winch; and
a winch control unit that controls the first winch based on the unwound length of the first wire and the second winch based on the unwound length of the second wire.

2. The winch control system according to claim 1, further comprising a direction measurement means that measures a direction of the second winch with respect to the first winch,
wherein the relative position of the second winch with respect to the first winch is measured based on the winch-to-winch distance and the direction of the second winch with respect to the first winch.

3. The winch control system according to claim 1, further comprising: a first height indicator that measures a first height that is a height of the first winch; and a second height indicator that measures a second height that is a height of the second winch,
wherein the relative position of the second winch with respect to the first winch is measured based on the winch-to-winch distance, and the first and the second height indicators.

4. The winch control system according to claim 1, further comprising a third winch arranged apart from each of the first and second winches that winds a third wire that suspends the object,
wherein the relative position determination unit determines a relative position of the third winch with respect to the first winch,
the unwound length calculation unit calculates the unwound lengths of the first and the second wires and a length of the third wire unwound from the third winch based on relative positions of the second and the third winches and the target position to which the object is to move, and
the winch control unit controls the third winch based on the unwound length of the third wire.

* * * * *

UNITED STATES PATENT AND TRADEMARK OFFICE
CERTIFICATE OF CORRECTION

| | |
|---|---|
| PATENT NO. | : 11,365,100 B2 |
| APPLICATION NO. | : 16/822516 |
| DATED | : June 21, 2022 |
| INVENTOR(S) | : Hiromu Yasuda |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 239 days.

Signed and Sealed this
Eleventh Day of February, 2025

Coke Morgan Stewart
*Acting Director of the United States Patent and Trademark Office*